US005676909A

United States Patent [19]

Hollinger, Jr.

[11] Patent Number: 5,676,909
[45] Date of Patent: Oct. 14, 1997

[54] ARCHIVAL PRESERVATION COATINGS AND ADHESIVES

[76] Inventor: William K. Hollinger, Jr., 8000-H Forbes Pl., Springfield, Va. 22151

[21] Appl. No.: 514,218

[22] Filed: Aug. 11, 1995

[51] Int. Cl.[6] .................. B01D 53/02; B32B 9/06; B65D 81/24
[52] U.S. Cl. ............ 422/40; 96/135; 428/411.1; 428/536; 162/181.2; 162/181.9; 206/204; 206/205
[58] Field of Search ............ 422/1, 4, 40; 162/181.1, 162/181.2, 181.9; 428/34.2, 411.1, 481, 535, 536; 206/214, 215, 425, 204, 205; 55/514; 96/11, 135

[56] References Cited

U.S. PATENT DOCUMENTS

| | | | |
|---|---|---|---|
| 3,671,310 | 6/1972 | Brown et al. | 428/535 |
| 4,046,939 | 9/1977 | Hart | 95/142 |
| 4,207,366 | 6/1980 | Tyler | 428/73 |
| 4,263,094 | 4/1981 | Login et al. | 428/534 X |
| 4,489,120 | 12/1984 | Hollinger, Jr. | 428/182 |
| 4,685,563 | 8/1987 | Cohen et al. | 206/328 |
| 4,753,832 | 6/1988 | Brown et al. | 428/35 |
| 4,806,398 | 2/1989 | Martin, Jr. | 428/34.2 |
| 4,835,025 | 5/1989 | Thompson et al. | 428/34.2 |
| 4,895,580 | 1/1990 | Morioka et al. | 96/144 X |
| 4,921,733 | 5/1990 | Gibbons et al. | 428/481 X |
| 4,927,705 | 5/1990 | Syme et al. | 428/920 X |
| 4,940,612 | 7/1990 | Gibbons et al. | 428/481 X |
| 5,008,137 | 4/1991 | Nugent, Jr. et al. | 428/35.4 |
| 5,215,192 | 6/1993 | Ram et al. | 206/205 |
| 5,417,743 | 5/1995 | Dauber | 96/135 X |
| 5,500,038 | 3/1996 | Dauber et al. | 96/135 |

FOREIGN PATENT DOCUMENTS

| | | |
|---|---|---|
| 678636 | 10/1991 | Switzerland . |
| 1007981 | 10/1965 | United Kingdom . |
| 91/14496 | 10/1991 | WIPO . |

OTHER PUBLICATIONS

Parks, et al. "Studies on the Degration Products of Paper With and Without Pollutants in a Closed Environment", NISTIR 4456, Dec. 1990.

A. Tulsi Ram, et al., "The Effects and Prevention of the 'Vinegar Syndrome'" Eastman Kodak Co., presented in part at the NAPM/AnSI IT9-2 Color sumcomm. on Nov. 17, 1992 and at the AMIA conference in San Francisco, CA on Dec. 10, 1992.

Primary Examiner—Robert J. Warden
Assistant Examiner—E. Leigh Dawson
Attorney, Agent, or Firm—Finnegan, Henderson, Farabow, Garrett & Dunner, L.L.P.

[57] ABSTRACT

Discussed is a method of preventing the physical degradation of an archival article due to exposure to environmental impurities by applying to a substrate a coating composition containing (i) an alkaline buffer capable of neutralizing acidic components from the environment of the archival article; and (ii) an adsorbent capable of removing chemical components from the environment of the archival article, drying the composition on the substrate to form a coated material; and preventing the physical degradation of the archival object by positioning the coated material in proximity to an archival article.

15 Claims, No Drawings

ARCHIVAL PRESERVATION COATINGS AND ADHESIVES

STATEMENT OF RELATED APPLICATIONS

The technology involved in this application is related to that disclosed in the following U.S. applications: Ser. No. 07/860,078, filed Mar. 30, 1992; Ser. No. 08/032,076, filed Mar. 16, 1993; and Ser. No. 08/149,499, filed Nov. 9, 1993 now abandoned. The specification of these related applications are hereby incorporated by reference.

FIELD OF THE INVENTION

This invention relates to archival preservation coatings and adhesives. More specifically, this invention relates to methods of preventing the physical degradation of an archival article from exposure to environmental impurities by using such coatings and adhesives.

BACKGROUND OF THE INVENTION

Archival articles are generally defined as objects of historical, aesthetic or sentimental significance, such as papers and photographs. Several attempts have been made to protect archival articles from the deleterious effects of impurities in the environment.

For example, previous attempts have been made to protect archival articles by storing them in containers designed to protect the archival articles from the deleterious effects of both impurities outside of the container and from residual chemicals within the container material. Cardboard containers have been coated with an acid in order to protect the contents of the container from alkaline fumes emitted from the adhesive used in container construction or sealing. Other containers have an inner layer incorporating an organic amide and an inorganic metal nitrate which inhibits metal corrosion.

Additionally, packages have been designed for photographic film in which a container or wrapping is substantially free from sulfur, ammonia, and turpentine. Such a package may also have a black, opaque outer layer and an inner layer which is inert towards light-sensitive, photographic emulsions.

Boxboards are also known which include a first layer of paperboard consisting of non-buffered, substantially pure alpha-cellulose and alkaline size, a second layer of a paperboard comprising alpha-cellulose, an alkaline buffer and an alkaline size and, between the first and second layers, a layer of water-impermeable plastic. The alkaline components may neutralize the acidic impurities in the environment of the archival article. The inner layer of the boxboard may be nonbuffered in order to avoid damage to the contents stored within the containers made from the boxboard.

However, the previous methods have not been sufficient to protect archival articles from all of the impurities in the environment of the archival articles. A wide variety of compounds are known to damage archival articles. For example, airborne pollutants from the surrounding atmosphere and the various by-products of deteriorating archival articles may contact and damage an archival article. For example, oxides of nitrogen may combine with moisture to form pollutants, such as nitric acid, which may contact and damage artifacts, such as photographs. Sulfur compounds may cause silver images, e.g. in photographs, microfilm, and microfiche, to fade by converting the metallic silver in the photographic layers to silver sulfide. Acids can also contact and damage photographs by bleaching and fading the silver image and causing the paper and, gelatin support to become brittle. Peroxides, in concentrations as low as one part in thirty million, may also cause image oxidation and fading.

Previous studies have also detected degradation products from the archival articles themselves which may further damage archival articles. The degradation products may be mobile and may be transferred from one article to another by surface or gas phase diffusion. Deterioration may also produce by-products such as organic acids, low molecular weight ketones, aldehydes and phenols.

SUMMARY OF THE INVENTION

The inventor has found that by incorporating an adsorbent and an alkaline buffer into coating compositions or adhesive mixtures to be applied to substrates to be placed in proximity to archival articles, many of the problems incurred due to limitations and disadvantages of the related art are overcome. In certain applications, only an adsorbent is used in the coating or adhesive compositions which may be placed in proximity to an alkaline buffer material. Such coating compositions or adhesive mixtures can be used, for example, to coat or paint walls and surfaces in collection rooms or conservation labs, to coat artifacts themselves, to coat surfaces of exhibit cases or display units, to coat packing or shipping crates, and to coat shelves, drawers, and other units or containers holding artifacts to be protected from molecules which may damage them or hasten their deterioration.

Similarly, adhesive compositions containing an adsorbent and alkaline buffer as described above can be used, for example, to secure two or more substrates together, such as in a multi-layered container wall.

The invention is directed to a method for preventing the physical degradation of an archival article due to exposure to environmental impurities. The method, which effectively removes both acids and other impurities or by-products having various molecular sizes from the environment of an archival article, includes the steps of applying to a substrate a coating composition comprising (i) an alkaline buffer capable of neutralizing acidic components from the environment of the archival article; and (ii) an adsorbent capable of removing chemical components from the environment of the archival article; drying the composition on the substrate to form a coated material; and preventing the physical degradation of the archival article by positioning said coated material in proximity to the archival article. The coating composition may also be in the form of a powder to be sprayed or dusted onto a surface; in this embodiment, there is no drying step.

The invention is also directed to a method for preventing the physical degradation of an archival article using an adhesive composition. This method comprises applying to a substrate an adhesive composition containing (i) an alkaline buffer capable of neutralizing acidic components from the environment of the archival article; and (ii) an adsorbent capable of removing chemical components from the environment of the archival article; adhering another substrate to the adhesive composition; drying the adhesive composition between the substrates; and preventing the physical degradation of the archival article by positioning the adhered substrates in proximity to the archival article.

The invention is further drawn to a method for preventing the physical degradation of an archival article using both adhesive and coating compositions. This method comprises applying to a substrate an adhesive composition containing (i) an alkaline buffer capable of neutralizing acidic components from the environment of the archival article; and (ii)

an adsorbent capable of removing chemical components from the environment of the archival article; adhering another substrate to the adhesive composition; drying the adhesive composition between the substrates; applying to the adhered substrates a coating composition having an alkaline buffer and an adsorbent as described above; drying the coating composition to form a coated material; and preventing the physical degradation of the archival article by positioning said coated material in proximity to the archival article.

Yet another embodiment of the present invention is directed to a method for preventing the physical degradation of an archival article comprising the steps of: applying to a substrate a coating composition comprising an adsorbent capable of removing chemical components from the environment of the archival article; drying the composition on the substrate to form a coated material; bringing the coated material in proximity to an alkaline buffer material as described above; and preventing the physical degradation of the archival article by positioning the coated material and the alkaline buffer material in proximity to the archival article.

Still another embodiment of the present invention is drawn to a coated substrate wherein the coating on the substrate comprises (i) an alkaline buffer capable of neutralizing acidic components from the environment of the archival article; and (ii) an adsorbent capable of removing chemical components from the environment of the archival article.

Additional features and advantages of the invention will be set forth in the description which follows, and in part will be apparent from the description, or may be learned by practice of the invention. The objectives and advantages of the invention may be realized and obtained by means of the materials and methods particularly pointed out in the written description and claims.

DETAILED DESCRIPTION OF THE INVENTION

To achieve these and other advantages and in accordance with the purpose of the invention as embodied and broadly described herein, a method for preventing the physical degradation of an archival article, particularly due to exposure to environmental impurities or other deteriorating conditions is disclosed. One method of the invention includes applying a coating composition to a substrate, drying the composition to form a coated material, and positioning the coated material in sufficient proximity to an archival article to prevent the article's physical degradation. Prevention is hereby defined as preventing or retarding, preferably significantly retarding, physical degradation.

The coating composition of the invention can comprise an alkaline buffer and an adsorbent, the alkaline buffer being capable of neutralizing acidic components from the environment of the archival article and the adsorbent being capable of removing chemical components from the environment of the archival article. In certain applications, the coating composition may comprise only an adsorbent, i.e., of the type described above. A coating of this type may be used in situations where the material coated with the adsorbent-containing composition will be placed in proximity to an alkaline buffer material as described above, e.g., alkaline buffered paper.

In other applications of the present invention, the coating composition may be in the form of a powder to be sprayed or dusted onto a surface. This embodiment involves no drying step. The powder may be dusted or sprayed onto a surface or substrate to which it adheres.

In another embodiment of the method of the present invention, the alkaline buffer and adsorbent, or adsorbent only, as described above are contained in an adhesive composition. The adhesive composition is applied to a substrate and another substrate is adhered to the adhesive composition. The composition between the substrates is dried, preferably allowed to dry on its own, and the adhered substrates are positioned in sufficient proximity to an archival article to prevent its physical degradation.

The application of the adhesive mixture can be repeated to form multiple layers of substrates, if a multi-layered material is desired. The substrates can be identical to or different from each other.

In yet another embodiment of the inventive method for preventing the physical degradation of an archival article, particularly due to exposure to environmental impurities or other deteriorating conditions, an adhesive composition as described above is applied to a substrate and another substrate is adhered to the adhesive composition. The composition between the substrates is dried, preferably by allowing it to dry on its own. Next, a coating composition as described above is applied to the adhered substrates. The coating composition is dried to form a coated material, and the coated material is positioned in sufficient proximity to the archival article to prevent its physical degradation.

For the purposes of the invention, the term "archival article" includes any article which it may be desirable to preserve for a short or long period of time. In a preferred aspect, an archival article includes any object of historic, aesthetic, sentimental or scientific significance. More preferably, an archival article is an article generally preserved in a private collection, a museum, a library, a historical society, an archive or an art gallery.

For example, an archival article may be a paper, including a document, a map, a paper currency, a stamp, a rare book, an album page, an artist's paper, a custom paper or a mounting board; a photographic image, including a film, a slide, a videotape, a microfiche, a microfilm or a photograph; a metal, including a coin, an ornament, or jewelry; a textile, including clothing, an artists' canvas, or a furniture covering; a sound recording, including a cassette tape, a record, or a compact disk (CD); an electronic component; a mechanical component; a computer disk or diskette; a plant, animal or mineral specimen, including a herbarium, a fur or a bone or tissue sample; or a fossil.

The archival preservation coating compositions and adhesive mixtures of the invention may be applied to a substrate and allowed to dry, leaving a surface that will neutralize acidic components and remove chemical components from the environment of any archival article the coated substrate is positioned in sufficient proximity to. The substrate may be a packaging material, container or support that holds or envelops (either completely or partially) an archival article, or the substrate may even be the surface of an archival article itself.

The substrate may include at least one fibrous, woven or nonwoven material, including paper, alkaline-buffered paper, canvas, a textile, wood, metal, glass cellulose, cotton, plaster, drywall, foam, plastic or combinations of these. The substrate could also be a previously painted surface from which the paint was not removed before applying the coating composition of the present invention. For example, a combination of substrate materials may be selected based on the desired appearance, porosity or types of impurities to be blocked, neutralized or absorbed.

The packaging material, preferably a paper, foam or cotton material, may be a cushioning material, a shredded paper, a barrier paper, a lining paper, an interleaving paper, a wrapping paper, or an enclosure paper.

The container may be of any shape and made of any material that is suitable to hold or envelop (either completely or partially) the archival article. The container may be, for instance, a display case, a drawer, a shelf, a rare book box, a record or document case, a photographic storage box, a map or print box, a file folder, an album, a scrapbook, a plastic enclosure, an envelope or a protective covering or fastener for a reel of film, such as a button and string tie.

A preferred embodiment of the container is a picture frame. The picture frame is preferably made of wood and has as part of its structure a rabbet. "Rabbet" is a term of art for a groove cut all around the inside of the back of a frame into which fits the article to be displayed in the frame, e.g., artwork or memorabilia. Alternatively, the rabbet may be cut to hold a piece of glass or plastic behind which the article to be displayed is placed.

In this embodiment of the presently claimed invention, therefore, the physical degradation of an archival article being displayed in a picture frame having a rabbet is prevented. When the article to be displayed is placed in the frame behind the glass or plastic, the coating on the rabbet keeps harmful contaminants from getting into the frame and damaging the article. The method of the invention includes applying to the rabbet and the lip of the rabbet a coating composition comprising an alkaline buffer and an adsorbent, as described above; drying the composition on the rabbet and lip of the rabbet to form a coated material; and preventing the physical degradation of the archival article by positioning said archival article in the picture frame. The composition of the present invention is preferably coated inside the groove, or "rabbet," and on the lip of the rabbet, i.e., level with the back of the frame. If alkaline matboard or alkaline paper is used in the framing of the article to be displayed, the coating composition may contain an adsorbent only.

The support, for example, may be a matte or mounting board, a foam-core board, a corrugated board, a framing or backing board, or an archival containment board. The support may also be a wall, such as in a conservation laboratory, a hospital or laboratory clean room, a collection room, a photographic darkroom or even a home or business in an area with dangerously high ozone levels, for example. Indeed, in an application envisioned for the presently claimed invention, the coating composition applied to the walls of a room could protect the occupants of the room (e.g., people, animals, mammals generally, or other life forms such as vegetation, insects, or reptiles) from the deleterious effects of pollutants or other harmful substances such as pollen, bacteria, or germs. This embodiment of the invention is directed to a method for maintaining, within an enclosed area, an environment substantially free of impurities. An "enclosed area" is hereby defined as an area which is partially or completely enclosed. The method includes the steps of applying to the interior surface of the enclosed area a coating composition comprising an alkaline buffer and an adsorbent, as described above, and drying the composition to form a coated surface on the interior of the enclosed area. "Interior surface" is hereby defined as all or part of the interior surface. In certain applications, only an adsorbent may be used. The enclosed area may be a photographic darkroom, a hospital or laboratory clean room, a conservation laboratory, a collection room, a museum exhibit case, a drawer, or a shipping or packing crate.

In a preferred aspect of the invention, multiple alkaline buffers and/or multiple adsorbents may be used in the coating composition or adhesive mixture. Preferably, the composition comprising an adsorbent and an alkaline buffer may be in a solution, such as a slurry or a colloidal solution, which may be applied to a surface and dried. The coating composition may be, for example, a paint.

The archival material of the present invention is made, in one embodiment, by applying to a substrate a solution made up of an alkaline buffer capable of neutralizing acidic components from the environment of the archival article and an adsorbent capable of removing chemical components from the environment of the archival article.

Another embodiment of the present invention is a coated substrate, wherein the coating is comprised of the alkaline buffer and adsorbent described above. The substrate may be coated using coating methods know in the art.

For the purposes of the invention, the term "alkaline buffer" includes all compounds which are capable of reducing or eliminating the effect of acidic components in an environment, i.e., deacidifying agents. The alkaline buffer to be used in the invention includes all known alkaline materials which are compatible with the articles which are to be preserved. The alkaline buffer may neutralize acids and other impurities which are in the environment of the archival article. The acids may be present due to acidic material penetrating the container or support holding the archival article, acidic materials originally in the atmosphere of a closed container, acidic materials from the archival articles themselves, or acidic by-products from the action of impurities in the environment of the archival article.

In a preferred aspect, the alkaline buffer in the inventive composition is an alkaline earth carbonate or bicarbonate, such as calcium carbonate, magnesium carbonate or magnesium bicarbonate. Zinc oxide or zinc carbonate may also be a suitable alkaline buffer. One or more alkaline buffers may be used, for example, a combination of calcium carbonate, magnesium, carbonate, and zinc oxide.

The adsorbents to be used in the invention include all known adsorbents which are compatible with the archival articles to be preserved. The adsorbents may adsorb, absorb or react and decompose a variety of impurities which are in the environment of the archival article. The impurities may be present due to impurities penetrating a container holding the archival article, impurities originally in the container material, impurities originally in the atmosphere of a closed container, impurities from the archival articles or by-products from impurities in the environment of the archival article. For example, impurities may be emitted from various sources such as interior building components including wood and oil based paints, air pollution or other archival artifacts, such as concentrations of pyrite trapped in fossils. Potential impurities may include, for example, oxidizing agents, hydrogen sulfide ($H_2S$), hydrogen peroxide ($H_2O_2$), sulfuric acid ($H_2SO_4$), ozone ($O_3$), formaldehyde, nitrogen oxides ($NO_x$), chlorine ($Cl_2$), and sulfur dioxide ($SO_2$), ketones, aldehydes, phenols, and their associated acids.

In a preferred embodiment, the adsorbent in the coating composition is an activated carbon (including modified activated carbon), activated charcoal, or similar carbon-containing adsorbent materials, a molecular sieve, silica, silicate gel, activated alumina or combinations of these. The adsorbent may also be todokorite, a form of manganese oxide which, like molecular sieves, contains a network of tunnels that can adsorb other compounds. Todokorite can exchange ions and contains large tunnel diameters of 0.69 nm. Preferably, the adsorbent is activated carbon or a molecular sieve, such as a zeolite.

Activated carbon may be defined as carbon (charcoal) treated at high temperature with steam, air or carbon dioxide which gives the carbon a porous internal structure and imparts improved adsorbent qualities. The activated carbon may also be modified with other materials, such as copper, chromium, or a caustic such as sodium hydroxide. The used activated carbon may be regenerated. Activated carbons are commercially available, such as PCB-G Pulverized, WPA, BL, FCA (treated with Cu and Cr), and Sel Fu Sorb (treated with Cu), produced by Calgon Carbon Corporation.

A molecular sieve includes a microporous structure, such as crystalline aluminosilicates, belonging to a class of materials known as zeolites, or crystalline aluminophosphates derived from mixtures containing an organic amine or quaternary ammonium salt. Molecular sieves are known for their selective molecular separations based on size and polar properties. Molecular sieves generally act as adsorbents for those molecules that are small enough to pass through the pores of the crystals to enter the cavities and be adsorbed on the interior surface. Molecular sieves such as the mesoporous materials referred to by Beck et al., *American Chemical Society*, Dec. 30, 1992, the disclosure of which is hereby incorporated by reference in its entirety, may provide up to about 700 or more square meters of surface area per gram. The used molecular sieves may also be regenerated, for example, by vacuum or a nitrogen sweep.

Zeolites are natural and synthetic compounds characterized by an aluminosilicate tetrahedral framework. Zeolites may have an aesthetic advantage over activated carbon in preserving archival articles as contemplated herein. Activated carbon generally will cause the preservation article, i.e., the substrate on which the coating compositions or adhesive mixtures of the present invention are applied, to have a gray appearance and may leave a pencil-like mark on an archival article that it contacts. The zeolites are generally white and do not leave marks on the archival articles they contact. Zeolites are commercially available, such as Purmol 3A (a synthetic sodium aluminosilicate, pore size approximately 3 angstroms), Purmol 4 A (a synthetic sodium aluminosilicate, pore size approximately 4 angstroms), Purmol 5 A (a synthetic calcium sodium aluminosilicate, pore size approximately 5 angstroms) and Purmo 13× (a synthetic sodium aluminum silicate, pore size approximately 10 angstroms), produced by ZeoChem. The zeolites may be pretreated, for example, by dehydration, ion exchange, or impregnation with compounds such as oxidants, including potassium permanganate, prior to becoming part of the coating composition.

In a preferred aspect, the alkaline buffer or combination of buffers and the adsorbent or combination of adsorbents, and the amount of alkaline buffer and adsorbent to be used are selected based on the type of impurities expected to be present in the environment of the archival article. For example FCA (treated with Cu and Cr) may adsorb or react with sulfides or peroxides; Sel Fu Sorb (treated with Cu) may adsorb or react with peroxide and sulfides; Purmol 4 A and Purmol 5 A may adsorb or react with peroxides, sulfides, sulfur dioxide and nitrogen oxides; and zinc oxide may adsorb or react with sulfides. Activated carbon may adsorb or react with low molecular weight materials, such as acetic acid and formic acid. Preferably, activated carbon may adsorb compounds having molecular weights of 60 or more. Activated carbon may adsorb or react with chlorine, ozone, peroxides, and possibly formaldehyde.

In another preferred embodiment, the adsorbent is a molecular sieve which has the characteristics of being organophilic, hydrophobic, and/or acid-resistant. Such molecular sieves are commercially available, e.g., Purmol 5 A-1 and Purmol 5 A-2, both of which are expected to be acid-resistant and hydrophobic and are produced by ZeoChem; MHSZ-173 and MHSZ-420, which are expected to be acid-resistant and hydrophobic and are produced by UOP Co.; and AW 300 and AW 500, which are expected to be acid-resistant and are produced by UOP Co.

Two or more adsorbents may be combined, particularly if the different adsorbents are selected to remove different impurities from the environment of the archival article. For example, zeolites of different pore sizes or combinations of zeolite(s) and activated carbon(s) may be mixed together in order to capture or react with molecules of varying sizes.

The combination of an alkaline buffer and an adsorbent according to the invention may also exhibit a synergistic effect. For example, the adsorbent may capture various impurities and prevent them from contacting and damaging the archival article. However, the captured impurity may react with another compound and release a product which may contact and damage the archival article. For example, sulfur dioxide ($SO_2$) which is trapped on an adsorbent may react with moisture and oxygen to produce sulfuric acid ($H_2SO_4$) which may contact and damage the archival article. However, in the invention, the alkaline buffer will neutralize acidic compounds, including sulfuric acid ($H_2SO_4$). Therefore, the combined action of the alkaline buffer and the adsorbent may have a synergistic effect.

The amount of alkaline buffer and adsorbent in the inventive composition may vary, depending on factors such as the configuration of the archival article and the coated or adhered material, the sensitivity of the archival article to the components of the coating or adhesive, the impurities expected to be in the environment of the archival article and the length of time for preservation. In a preferred embodiment, the coating or adhesive may preferably contain an amount of alkaline buffer or buffers which ranges from about 1 to about 20%, and more preferably from about 2 to about 5%, and most preferably from about 3 to about 5% by weight based on the total weight of the coating or adhesive composition. In a further preferred embodiment, the coating or adhesive composition may preferably contain an amount of adsorbent or adsorbents which ranges from about 1 to about 50%, more preferably from about 5 to about 35%, and most preferably from about 15 to about 35% by weight based on the total weight of the composition.

A coating composition based on the present invention can be made, for example, by suspending activated carbon and calcium carbonate into a colloidal suspension with the use of bentonite, a colloidal clay which is composed chiefly of montmorillonite, an aluminosilicate clay with a high cation exchange capacity. Bentonite forms gelatinous suspensions at low concentrations and exchanges the surface charge. The coating composition may also include latex or other binders used in paints, emulsions, and coatings.

Paper may be coated by using a mixture comprising clay and adhesives. The coating can be applied during the manufacturing process or after the paper is made. Alkaline buffers and adsorbents according to the present invention can be used in partial or complete replacement of the clay normally used to coat paper and/or can be mixed with the adhesive. The alkaline buffers and adsorbents can be mixed with solid, liquid, or gas (e.g., aerosol) phase adhesives.

Other methods can be used to produce a coating or adhesive based on the present invention. Those of ordinary skill in the art will recognize other methods of producing a coating or adhesive.

The following examples are illustrative of the invention, but are not intended to limit it.

EXAMPLES

Example 1

Photographic negatives were placed inside two paperboard boxes, each box having three holes drilled in two opposing sides. Box #1 was coated inside with a coating composition of the present invention comprising about 1% bentonite, 3% acrylic latex, 3% calcium carbonate, 34.8% activated carbon, and water. The pH of the composition was 9.5. The viscosity of the composition was 535 centipoise, measured with a Brookfield Viscometer LVF. Box #2 was not coated.

2000 ppm $H_2O_2$ was then released into the environment of the boxes. The negatives in Box #2, the uncoated box, were heavily damaged. However, the negatives in Box #1, the coated box, were totally undamaged, despite the fact that there were six holes drilled in the sides of the box, potentially allowing environmental impurities to enter.

Example 2

Newspaper, pH paper, and a piece of shiny copper were placed inside two paperboard boxes. Box #1 was coated inside with a coating composition of the present invention as in Example 1. Box #2 was not coated.

Both boxes were placed together in a chamber with 2000 ppm $NO_2$. In Box #2, the uncoated box, the pH paper registered acidic, the newspaper was heavily damaged and yellowed, and the copper was severely tarnished. In Box #1, the coated box, the newspaper was totally undamaged, the copper remained shiny, and the pH paper did not register a change, i.e., it did not become acidic.

Example 3

Newspaper and pH paper were placed under two sheets of alkaline buffered 0.010 tan paper which had been laminated together with an adhesive composition comprising polyvinyl alcohol and an adsorbent. The amount of alkaline buffer in the buffered paper was about 3.5%. The amount of adsorbent is shown in the table below. 2000 ppm $NO_2$ were then released into the environment of the paper. The results are shown in Table 1 below.

TABLE 1

| Adsorbent in Adhesive Composition | | |
|---|---|---|
| ADSORBENT (% IN ADHESIVE) | NEWSPAPER | pH PAPER |
| Zeolite (20%) | no change | no change |
| Activated carbon (20%) | yellowing | becoming acidic |
| Zeolite (10%) | yellowing | becoming acidic |
| Activated carbon (10%) | yellowed | acidic |
| No adsorbent | yellowed | acidic |

As can be seen, better results were obtained, i.e., newspaper remained white and pH paper remained purple (neutral), when zeolite was used as the adsorbent in an amount of 20%.

What is claimed is:

1. A method for preventing the physical degradation of an archival article comprising the steps of:

(a) providing an archival article in an environment;

(b) applying to a substrate an adhesive composition comprising:

(i) an adhesive;

(ii) an alkaline buffer; and (iii) an adsorbent, said alkaline buffer being capable of neutralizing at least one acidic component from the environment of the archival article and said adsorbent being capable of removing at least one chemical component from the environment of the archival article;

(c) adhering another substrate to the adhesive composition;

(d) drying the adhesive composition between the substrates; and (e) preventing the physical degradation of the archival article by positioning the adhered substrates in proximity to the archival article.

2. The method of claim 1, wherein said adhesive mixture is applied to multiple layers of substrates by repeating steps (a) and (b).

3. The method of claim 1, wherein the substrates are identical or different, and further wherein said substrates are a surface of a packaging material, a container, or a support that envelops the archival article.

4. The method of claim 1, wherein the substrate is paper, canvas, textiles, wood, metal, glass, cellulose, cotton, foam, plastic, or any combination thereof.

5. The method of claim 1, wherein said alkaline buffer is calcium carbonate, magnesium carbonate, magnesium bicarbonate, zinc oxide, zinc carbonate, or a mixture thereof.

6. The method of claim 1, wherein said adsorbent is activated carbon, a molecular sieve, or a mixture thereof.

7. The method of claim 6, wherein said molecular sieve is a zeolite.

8. A method for preventing the physical degradation of an archival article comprising the steps of:

(a) providing an archival article in an environment;

(b) applying to said archival article a coating composition comprising (i) an alkaline buffer; and (ii) an adsorbent, said alkaline buffer being capable of neutralizing at least one acidic component from the environment of the archival article and said adsorbent being capable of removing at least one chemical component from the environment of the archival article; and (c) drying the composition on the archival article to form a coated material.

9. A method for preventing the physical degradation of an archival article comprising the steps of:

(a) providing an archival article in an environment;

(b) applying to said archival article an adhesive composition comprising:

(i) an adhesive;

(ii) an alkaline buffer; and (iii) an adsorbent, said alkaline buffer being capable of neutralizing at least one acidic component from the environment of the archival article and said adsorbent being capable of removing at least one chemical component from the environment of the archival article;

(c) adhering a substrate to the adhesive composition; and (d) drying the adhesive composition between the archival article and said substrate.

10. A method for preventing the physical degradation of an archival article comprising the steps of:

(a) providing an archival article in an environment;

(b) applying to a substrate an adhesive composition comprising:
   (i) an adhesive;
   (ii) an alkaline buffer; and
   (iii) an adsorbent,
said alkaline buffer being capable of neutralizing at least one acidic component from the environment of the archival article and said adsorbent being capable of removing at least one chemical component from the environment of the archival article;

(c) adhering another substrate to the adhesive composition;

(d) drying the adhesive composition between the substrates;

(e) applying to the adhered substrates a coating composition comprising
   (i) an alkaline buffer; and
   (ii) an adsorbent,
said alkaline buffer being capable of neutralizing at least one acidic component from the environment of the archival article and said adsorbent being capable of removing at least one chemical component from the environment of the archival article;

(f) drying the coating composition to form a coated material; and (g) preventing the physical degradation of the archival article by positioning said coated material in proximity to the archival article.

11. A method for preventing the physical degradation of an archival article comprising the steps of:

(a) providing an archival article in an environment;

(b) applying to a substrate an adhesive composition comprising an adsorbent capable of removing at least one chemical component from the environment of the archival article;

(c) adhering another substrate to the adhesive composition;

(d) drying the adhesive composition between the substrates; and (e) bringing the adhered substrates in proximity to an alkaline buffer material capable of neutralizing at least one acidic component from the environment of the archival article; and (f) preventing the physical degradation of the archival article by positioning the adhered substrates and the alkaline buffer material in proximity to the archival article.

12. A method for preventing the physical degradation of an archival article being displayed in a picture frame having a rabbet, the method comprising the steps of:

(a) providing an archival article displayed in a picture frame having a rabbet and being located in an environment;

(b) applying to the rabbet and a lip of the rabbet a coating composition comprising an adsorbent which is capable of removing at least one chemical component from the environment of the archival article;

(c) drying the composition on the rabbet and lip of the rabbet to form a coated material; and (d) preventing the physical degradation of the archival article by positioning said archival article in the picture frame having the coated rabbet.

13. The method of claim 12, wherein said coating composition further comprises an alkaline buffer which is capable of neutralizing at least one acidic component from the environment of the archival article.

14. A method for maintaining, within an enclosed area, an environment substantially free of impurities, the method comprising the steps of:

(a) applying to an interior surface of said enclosed area a coating composition comprising an adsorbent which is capable of removing at least one chemical component from the environment; and (b) drying the composition to form a coated surface on the interior of the enclosed area;

wherein said enclosed area is a photographic darkroom, a hospital or laboratory clean room, a conservation laboratory, a collection room, a museum exhibit case, a drawer, or a shipping or packing crate.

15. The method of claim 14, wherein said coating composition further comprises an alkaline buffer which is capable of neutralizing at least one acidic component from said environment.

* * * * *